Patented Oct. 10, 1922.

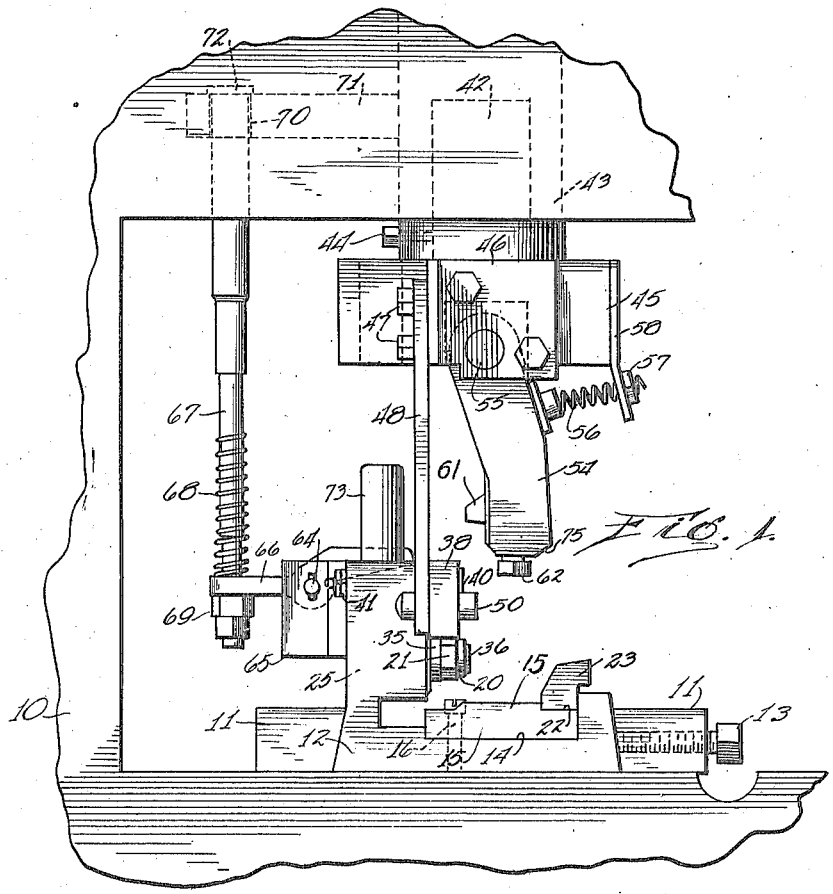

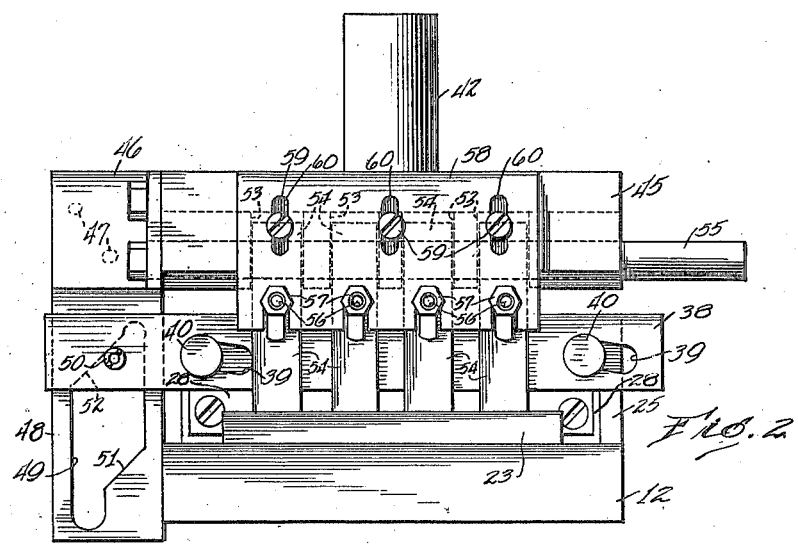

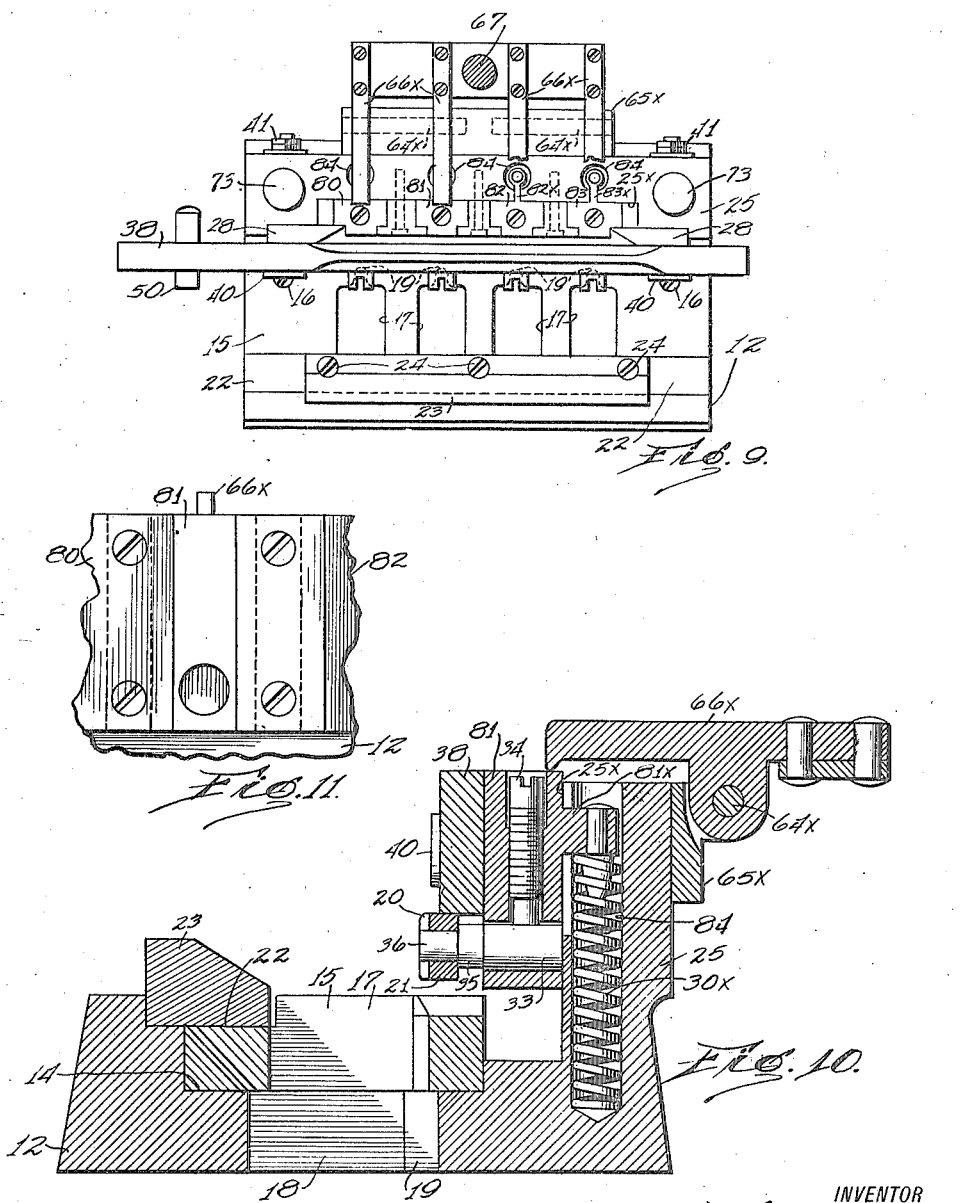

1,431,690

UNITED STATES PATENT OFFICE.

FREDERICK A. SCHROEDER, OF CHICAGO, ILLINOIS.

NUT-SLOTTING DEVICE.

Application filed April 7, 1921. Serial No. 459,282.

*To all whom it may concern:*

Be it known that I, FREDERICK A. SCHROEDER, a citizen of the United States, and a resident of the city of Chicago, in the county of Cook and State of Illinois, have invented a new and useful Improvement in Nut-Slotting Devices, of which the following is a full, clear, and exact description.

My invention relates to improvements in nut slotting devices, being primarily designed for the making of "castle nuts", and it consists in the combinations, constructions and arrangements herein described and claimed.

An object of my invention is to provide a device which will greatly reduce the cost of making castle nuts.

A further object of my invention is to provide a nut slotting device which will obviate the necessity of the use of a milling machine for this purpose.

A further object of my invention is to provide a nut slotting device which may be used in connection with any power-driven punch press, the slotting operation being accomplished by a single stroke in which the metal is punched out.

A further object of my invention is to provide a device of the type described in which a plurality of nuts may be operated on at one stroke, and in which the nuts are automatically turned between successive strokes to permit of a rapid and accurate operation.

A further object of my invention is to provide a device of the type described which will facilitate the placing of the nuts in position to be punched, and which will permit them to be removed quickly after the punching operation.

Other objects and advantages will appear in the following specification, and the novel features of the invention will be particularly pointed out in the appended claims.

My invention is illustrated in the accompanying drawings, forming part of this application, in which Figure 1 is a side view showing my invention as applied to a punch press, Figure 2 is a front view of the device, Figure 3 is a face view of the lower or stationary part of the device, Figure 4 is a side elevation of the part shown in Figure 2, Figure 5 is a plan view of the parts shown in Figure 3, Figure 6 is a section along the line 6—6 of Figure 3, Figure 7 is a section along the line 7—7 of Figure 5, Figure 8 is a section through one of the movable punch carrying members, Figure 9 is a plan view of a modified form of the device, Figure 10 is an enlarged sectional view along the line 10—10 of Figure 9, and Figure 11 is a detail plan view of a portion of the mechanism shown in Figure 9.

In carrying out my invention, I make use of an ordinary power-driven punch press. In Figure 1 a portion of this press is shown at 10. To this portion is secured stationary holding members 11 which are spaced apart to permit the entrance of the base 12 of the nut slotting device proper. The base is secured between the members 11 in any suitable manner, as, for instance, by one or more set screws 13. This base, as will be seen from the drawings, is provided with a recess 14 (see Figure 1) arranged to receive a die plate 15 which is secured to the base 12 by screws 16. This die plate 15 has a plurality of openings 17 arranged to register with corresponding openings 18 in the base 12, for a purpose hereinafter explained. Communicating with the openings 17 are small slots 19 which constitute portions of female die members. At the upper edge of the slots 19 the die plate is formed with an arc-shaped seat which is arranged to receive the cylindrical extension 20 of the nuts 21 which are being slotted.

The die plate 15 has a longitudinal slot 22 arranged to receive a cam plate or bar 23 which is secured in position by screws 24.

The base 12 has an upstanding integral portion 25, having a vertically extending longitudinal slot $25_x$, in which is disposed a vertically slidable carrier plate 26, end bearing strips 27 and retainer plates 28 being provided, as shown in Figure 5. The upright portion 25, in that form of the device shown in Figures 5 and 6, is provided with vertical bores 29 arranged to receive a pair of springs, such as that shown at 30 in Figures 6 and 7. The carrier plate 26 is provided with pins 31 which extend through slots 32 (see Figure 7), and are engaged by the springs 31. The latter tend to maintain the carrier 26 in upper position, but the carrier may be moved downwardly against the tension of the springs, as will be explained later. The carrier 26 is provided with a plurality of pins or arms for supporting the nuts which are to be slotted. In Figure 6 I have shown one of these pins in detail. It consists of a body portion 33 which fits in a bore in the carrier, being secured in position by means of a set screw 34. An enlarged portion 35 forms a backing or stop portion against which the nut 21 may rest, a reduced portion 36 of the pin being provided to receive the nut which is merely slipped over the reduced portion. The end of the reduced portion 36 is slotted, as shown at 37, so as to permit the entrance of the punch or cutter.

As will be seen from the drawings, I have provided a plate 38 which is mounted above the nut holding means, and which has slots 39 inclined slightly to the horizontal, bolts 40 being provided which extend through the retainer plate 28 and the upright 25 to the rear of the latter, nuts 41 being carried by the bolts for securing them in position. The plate 38 slides on these bolts 40. Normally the plate 38 is in the position shown in Figure 3. In this position the lower edge of the plate rests on the tops of the row of nuts. This keeps the nuts in alinement until they are being slotted or punched. It will be observed, however, that there are extensions 38$_x$ between adjacent nuts which engage the corners of the nuts to turn them when the plate is moved from right to left in Figure 3 by the mechanism described later. It will also be observed that in order for the plate to move from right to left in Figure 3, it is necessary that the plate be raised from the nuts slightly, this action being due to the angular relation of the slots 39.

Coacting with the parts thus far described is an upper portion, having a spindle 42 arranged to enter a chuck 43 of a punch press, the spindle being retained in any suitable manner, as by means of a set screw 44. Integral with the spindle 42 is a body portion 45, having an L-shaped flange 46 secured thereto at one end thereof. Rigidly secured to the flange 46 by means of screw bolts 47, or in any other suitable manner, is a cam plate 48 having an opening 49 of the shape shown in the drawings, and arranged to receive a cam pin or roller 50 carried by the slidable plate 38. The arrangement is such that when the punch press chuck 43 is raised, in the normal operation of the punch press, it will raise the body portion 45 with it, and carry upwardly the cam plate 48. When the pin or roller 50 engages the inclined surface 51 of the cam plate, it will force the slidable plate 38 from right to left in Figure 2, and when the punch press takes a downward stroke, the cam surface 52 will engage the roller or pin 50 to force the plate 38 in the opposite direction.

As will be seen from Figures 1 and 2, the body portion 45 of the upper movable member is provided with a series of recesses 53, each receiving a punch carrying arm 54, these arms being journaled on a common pivot shaft 55 which extends longitudinally of the body portion and through the recess 53. To each arm is secured a spring, such as that shown at 56 in Figure 1, the outer end of the spring being secured by means of a nut 57 to a downwardly extending slotted plate 58, which is fastened to the body portion 45 by means of bolts 59 that project through slots 60 in the plate 58, so as to permit the latter to be adjusted if desired. The springs 56 normally keep the arms 54 in the position shown in Figure 1. Each of the arms 54 is provided with a recess arranged to receive a punch or cutter 61, which is secured in position by means of a set screw 62. By unloosening the set screw, the punch or cutter 61 may be removed for replacement by a new punch, or for any other purpose. To facilitate the removal of the punch, an opening 63 is provided in the arm 54, into which a tool may be inserted, so that the punch may be driven out.

Pivotally secured at 64 on the bracket 65, attached to the upright 25 of the lower stationary portion of the nut slotting device, is a lever 66, through which a rod 67 loosely extends. Above the lever 66 is a spring 68 which bears on the upper portion of the lever at one end and on a shoulder on the rod at the other end. Below the lever are nuts 69 which adjust the position of the lever with respect to the rod. The upper end of the rod extends through an opening 70 in an arm 71 which is carried by the chuck 43 of the punch press. The arm 71 is designed to engage a head 72 on the rod 67 when the punch press is in its upper position, i. e., that shown in Figure 1. This will pull upwardly on the rod 67 and cause the free end of the lever to push downwardly on the carrier 26, thus moving the nut bearing pins 36 downwardly, so as to free the nuts from the plate 37, thereby permitting the rapid removal or replacement of the nuts.

From the foregoing description of the various parts of the device, the operation thereof may be readily understood. When the device is in the position shown in Figure 1, a plurality of nuts is slipped on the nut carrying pins 36, and power is applied to the press. As the chuck 43 descends, the arm 71 goes with it and releases the lever 66, so that the carrier 26, which is pressed on by the lever, is now forced upwardly so as to bring the upper edges of the nuts against the lower edge of the plate 38 (see Figure 3). Further movement of the punch press will cause the guide rods 73 carried by the upright portion 25 to enter bores 74 in the body portion 45, thus guiding the upper member in its movement. When the lower outer beveled ends 75 of the arms 54 engage the cam plate 23, the arms 54 will be swung inwardly against the tension of the spring 56, and the punch 61 will enter the slots 37 just above the lower portion of the ring-like extension 20 of the castle nuts. The punch portions, on further movement, will engage these lower ring portions, and will force the nuts downwardly against the tension of the springs 30, until the nuts are seated in the recesses or seats 76 (see Figures 1, 4 and 5). Further movement of the punch will cause it to punch or cut a portion of the tubular extension 20 of the nut, the punch passing into the slot of the die 19. It will be observed that in the downward movement of the body portion 45, and the cam plate 48 which is carried with it, the cam surface 52 will engage the pin or roller 50 on the plate 38, and force it to the right in Figure 2. This is easily accomplished, because the nuts, as has been explained, have been carried downwardly, and the plate is free to move.

On the reverse movement of the punch press, the punches pass out, and when the cam plate 23 is cleared, the arms 54 are swung outwardly by the springs 56 into the position shown in Figure 1. On the continued upward movement of the punch press, the cam surface 51 of the cam member 48 engages the roller 50 and moves the plate 38 from right to left in Figures 2 and 3. The extensions $38_x$ of the plate will engage the nuts and will turn them one-sixth of a revolution (if hexagonal nuts are used), thus bringing the nuts in position to have another cut taken from the tubular extension 20. The action is continued until the rim or tubular extension has been cut or punched all around to form the castle or slotted nuts. When this is done, and the punch press is in its upper position, the carrier 26 is pressed downwardly by the lever 66, as explained, and the nuts may be removed, and others which are to be operated on may be replaced on the nut receiving pins 36.

In the form of the device just described, the nuts which are being operated on are mounted on a common carrier. Occasionally, however, one nut may be a little larger than another one, and this may throw an unequal strain on the carrier. In order to obviate any difficulty arising from such condition, I may provide individual carriers, such as those shown at 80, 81, 82, and 83 in Figure 9. In this form of the device, the body portion 25 is provided with a bore 84 for each carrier. The latter has an extension, such as that shown at $81_x$ in Figure 10, which enters the bore, and which engages the spring $30_x$. The carriers 80, 81, 82 and 83 are individually operated, so that even if the nuts should vary in diameter, it would not throw a strain on the mechanism. In this form of the device the rod 67 simultaneously actuates a plurality of levers $66_x$, there being one of these levers for each carrier, so that when the punch press is in its highest position, the outer end of all of the levers moves downwardly, thus forcing the individual carriers downwardly and releasing the nuts carried thereby from the plate 38.

The device constructed as disclosed permits the rapid slotting of the nuts, since each slot is made by one operation, that is to say, one stroke of the punch press. Furthermore, the turning of the nuts automatically obviates the necessity of their being turned manually, which is necessary in the milling machine. The fact that the nuts are punched and not cut also permits a rapidity of operation which is not attainable with the ordinary milling machine.

I claim:

1. A nut slotting machine comprising a stationary body portion, means for supporting a nut on said body portion, a reciprocating member, a punch pivotally carried by said reciprocating member, and means actuated by the movement of the reciprocating member for causing the punch to engage the nut.

2. A nut slotting machine comprising a stationary body portion, means for yieldingly supporting a nut on said body portion, a die carried by the body portion and arranged to receive the nut, a reciprocating member, a punch pivotally carried by said reciprocating member, and means actuated by the movement of said reciprocating member for causing the punch to engage the nut and to force it down upon said die.

3. A nut slotting machine comprising a stationary body portion, means for supporting a nut on said body portion, a reciprocating member, a punch pivotally carried by said reciprocating member, means actuated by the movement of said reciprocating member for causing the punch to engage the nut for slotting the latter, and means for automatically turning the nut to a different position at each stroke of the reciprocating member.

4. A nut slotting machine comprising a stationary body portion, means for supporting a plurality of nuts on said body portion, a reciprocating member, a plurality of punches pivotally carried by said reciprocating member, and means actuated by the movement of the reciprocating member for causing said punches simultaneously to engage their respective nuts and to slot the latter.

5. A nut slotting machine comprising a stationary body portion, a spring pressed movable carrier mounted on said body portion, means for supporting a nut on said movable carrier, a reciprocating member, an arm pivotally mounted on said reciprocating member, a punch carried by said arm, and a stationary cam member arranged to be engaged by the arm to swing the arm and to bring the punch into engagement with the nut for slotting the latter.

6. A nut slotting machine comprising a stationary body portion, a spring pressed movable carrier mounted on said body portion, means for supporting a nut on said movable carrier, a reciprocating member, an arm pivotally mounted on said reciprocating member, a punch carried by said arm, a stationary cam member arranged to be engaged by the arm to swing the arm and to bring the punch into engagement with the nut for slotting the latter, and means for automatically turning the nut at each stroke of the reciprocating member.

7. A nut slotting machine comprising a stationary body portion, spring pressed movable means for supporting a plurality of nuts on said body portion, a seat disposed below each nut and arranged to receive its respective nut, a reciprocating member, a plurality of arms pivotally mounted on the reciprocating member, a punch carried by each arm, a cam member arranged to be engaged by all of the arms to swing the latter toward the nuts, each of said punches being arranged to engage its individual nut and to force it on said seat during a portion of a stroke of the reciprocating member, and to slot the nut during the remaining portion of the stroke.

8. A nut slotting machine comprising a stationary body portion, spring pressed movable means for supporting a plurality of nuts on said body portion, a seat disposed below each nut and arranged to receive its respective nut, a reciprocating member, a plurality of arms pivotally mounted on the reciprocating member, a punch carried by each arm, a cam member arranged to be engaged by all of the arms to swing the latter toward the nuts, each of said punches being arranged to engage its individual nut and to force it on said seat during a portion of a stroke of the reciprocating member, and to slot the nut during the remaining portion of the stroke, and means for automatically alining the nuts prior to their engagement by the punches.

9. A nut slotting machine comprising a stationary body portion, spring pressed movable means for supporting a plurality of nuts on said body portion, a seat disposed below each nut and arranged to receive its respective nut, a reciprocating member, a plurality of arms pivotally mounted on the reciprocating member, a punch carried by each arm, a cam member arranged to be engaged by all of the arms to swing the latter toward the nuts, each of said punches being arranged to engage its individual nut and to force it on said seat during a portion of a stroke of the reciprocating member, and to slot the nut during the remaining portion of the stroke, means for automatically alining the nuts prior to their engagement by the punches, and for rotating the nuts on their axes to a new position between each slotting operation.

10. In a nut slotting device, a stationary body portion, spring pressed means for supporting a plurality of nuts on said body portion, a longitudinally movable bar for initially holding the nuts in alinement, and means carried by the bar for turning the nuts a portion of a revolution when the bar is moved longitudinally.

11. In a nut slotting device, a stationary body portion, spring pressed means for supporting a plurality of nuts on said body portion, a longitudinally movable bar for initially holding the nuts in alinement, means carried by the bar for turning the nuts a portion of a revolution when the bar is moved longitudinally, a reciprocating member, and means carried by said reciprocating member for moving said bar at each reciprocation.

12. In a nut slotting device, a stationary body portion, spring pressed means for supporting a plurality of nuts on said body portion, a longitudinally movable bar for initially holding the nuts in alinement, means carried by the bar for turning the nuts a portion of a revolution when the bar is moved longitudinally, a reciprocating member, means carried by said reciprocating member for moving said bar at each reciprocation, and a plurality of punches carried by said reciprocating member and arranged to engage said nuts to slot them.

13. In a nut slotting device, a stationary body portion, spring pressed means for supporting a plurality of nuts on said body portion, a longitudinally movable bar for initially holding the nuts in alinement, means carried by the bar for turning the nuts a portion of a revolution when the bar is moved longitudinally, a reciprocating member, means carried by said reciprocating member for moving said bar at each reciprocation, a plurality of punches carried by said reciprocating member and arranged to engage said nuts to slot them, and means actuated at the end of the stroke of the reciprocating member for releasing the nuts from the engagement with the alining bar.

14. A nut slotting machine comprising a stationary body portion, a plurality of spring pressed slidable carriers mounted on said body portion, means for supporting a nut on each of said carriers, a reciprocating member, means for simultaneously moving said spring pressed carriers at the end of the stroke of the reciprocating member, and means carried by said reciprocating member for engaging the nuts simultaneously to slot them.

FREDERICK A. SCHROEDER.